US008478441B2

(12) United States Patent
Liguori et al.

(10) Patent No.: US 8,478,441 B2
(45) Date of Patent: Jul. 2, 2013

(54) METHOD AND APPARATUS FOR STORAGE AND DISPENSING OF PHARMACEUTICAL PRODUCTS IN UNIT DOSES OR ADMINISTRATION UNITS

(75) Inventors: Pierangelo Liguori, Gragnano Trebbiense (IT); Giorgio Pavesi, Gragnano Trebbiense (IT); Fulvio Rudello, Gragnano Trebbiense (IT)

(73) Assignee: Ingegneria Biomedica Santa Lucia S.p.A., Gragnano Trebbiense (Piacenza) (IT)

( * ) Notice: Subject to any disclaimer, the term of this patent is extended or adjusted under 35 U.S.C. 154(b) by 204 days.

(21) Appl. No.: 12/933,187

(22) PCT Filed: Mar. 17, 2009

(86) PCT No.: PCT/IB2009/051121

§ 371 (c)(1),
(2), (4) Date: Sep. 17, 2010

(87) PCT Pub. No.: WO2009/115985

PCT Pub. Date: Sep. 24, 2009

(65) Prior Publication Data

US 2011/0017764 A1 Jan. 27, 2011

(30) Foreign Application Priority Data

Mar. 19, 2008 (IT) .................................. PR08A0019

(51) Int. Cl.

| | |
|---|---|
| ***A61J 1/03*** | (2006.01) |
| ***B25J 9/00*** | (2006.01) |
| ***G06F 17/00*** | (2006.01) |

(52) U.S. Cl.
USPC ............ 700/243; 700/242; 700/232; 700/236

(58) Field of Classification Search
USPC .................................. 700/232, 236, 242, 243
See application file for complete search history.

(56) References Cited

U.S. PATENT DOCUMENTS

| | | | | |
|---|---|---|---|---|
| 3,637,095 A * | 1/1972 | Kampfer | ................. | 414/331.07 |
| 3,743,116 A * | 7/1973 | Giessler et al. | ............... | 414/279 |
| 4,032,027 A * | 6/1977 | Lindberg | ...................... | 414/400 |
| 4,277,216 A * | 7/1981 | Lindberg | ................ | 414/331.09 |
| 4,638,922 A * | 1/1987 | Stoltz | .............................. | 221/75 |

(Continued)

FOREIGN PATENT DOCUMENTS

| | | |
|---|---|---|
| EP | 0656200 A2 | 6/1995 |
| WO | 0016213 A1 | 3/2000 |
| WO | 20060052863 A1 | 5/2006 |

OTHER PUBLICATIONS

International Search Report, dated Jul. 24, 2009, from corresponding PCT application.

*Primary Examiner* — Michael K Collins
(74) *Attorney, Agent, or Firm* — Young & Thompson

(57) ABSTRACT

A method and automated apparatus (1) for dispensing pharmaceutical products in unit doses or administration units wherein the unit doses (2) suitably arranged and/or separated within the apparatus (1) can be dispensed into the compartments (5) of an associated cart (4), to fill patient-specific medication prescriptions for patients of a ward. A telescopic manipulator unit (6, 106, 206) has elements (16) adapted to select and pick up the doses required to fill patient-specific medication prescriptions from a matrix (10) of unit doses (2) and elements (7, 107) for coupled interaction with the compartments (5) to directly release the picked up doses (2) therein.

25 Claims, 20 Drawing Sheets

U.S. PATENT DOCUMENTS

| | | | | |
|---|---|---|---|---|
| 5,313,393 | A * | 5/1994 | Varley et al. | 705/28 |
| 5,468,110 | A * | 11/1995 | McDonald et al. | 414/273 |
| 5,880,443 | A | 3/1999 | McDonald et al. | |
| 6,056,496 | A * | 5/2000 | Myers et al. | 414/398 |
| 6,219,587 | B1 * | 4/2001 | Ahlin et al. | 700/233 |
| 6,231,292 | B1 * | 5/2001 | Wyssmuller et al. | 414/331.07 |
| 6,354,783 | B1 * | 3/2002 | Stoy et al. | 414/398 |
| 7,155,306 | B2 * | 12/2006 | Haitin et al. | 700/242 |
| 7,377,402 | B2 * | 5/2008 | Takeda | 221/312 A |
| 7,428,447 | B2 * | 9/2008 | Stonikas et al. | 700/244 |
| 7,628,410 | B2 * | 12/2009 | Fitzgerald et al. | 280/47.35 |
| 7,809,470 | B2 * | 10/2010 | Shoenfeld | 700/243 |
| 7,930,060 | B2 * | 4/2011 | Yuyama et al. | 700/214 |
| 2001/0019065 | A1 | 9/2001 | William et al. | |
| 2004/0034447 | A1 | 2/2004 | Vollm | |
| 2009/0138122 | A1 * | 5/2009 | Wagner | 700/226 |

* cited by examiner 1
1a
1b
2
3
4
5
6
7
8
9
12
A.
B.
C.

E.

D.

C.

METHOD AND APPARATUS FOR STORAGE AND DISPENSING OF PHARMACEUTICAL PRODUCTS IN UNIT DOSES OR ADMINISTRATION UNITS

FIELD OF THE INVENTION

The present invention relates to an apparatus for storage and automated dispensing of pharmaceutical products in unit doses or administration units.

The invention further relates to a method for pharmaceutical storage, pick-up and dispensing.

SUMMARY OF THE INVENTION

Particularly, means are provided for selecting and picking up unit doses from a matrix of unit doses to fill together a patient-specific medication prescription, and means for interacting with containers or compartments of a cart associated to such apparatus, to directly load the products that have been picked up.

The compartment may be loaded either with all the doses that have been selected and temporarily held by a holder or container means attached to the selector means, or with individual doses to be released into the cart compartment as they are individually selected.

One of the main advantages derived from the present invention is effective and safer administration of medicaments, due to full automation of the process by the inventive apparatus, that directly loads the compartments of an associated cart to be used for dispensing of patient-specific drug dosages throughout the ward.

A further advantage is given both by a selection system based on unit dose barcode reading and by a pick-up system that uses a special telescopic manipulator and possibly an internal medicament holding container.

Further advantages include:

- convenient loading, control and dispensing of unit doses into the dispensing vessel, such control being ensured for each unit dose,
- safe method of individual selection by barcode reading,
- possible immediate supply of one or more medicaments, in case of urgent needs,
- possible separation of oral and intravenous drugs,
- significant saving of nurse time for manual preparation of therapies and for logistic of drugs.

Finally, it will be appreciated that the whole process can be managed by dedicated software that can indicate how many units are present in the apparatus and how many are required and how many are missing to fulfill the patient-specific prescription and hence to fill each compartment.

These objects and advantages are fulfilled by the method and automated apparatus for dispensing pharmaceutical products in unit doses or administration units according to the present invention, which is characterized by the annexed claims.

BRIEF DESCRIPTION OF THE DRAWING FIGURES

This and other features will be more apparent upon reading of the following description of a few preferred embodiments, which are shown by way of example and without limitation in the accompanying drawings, in which.

Figure 3:
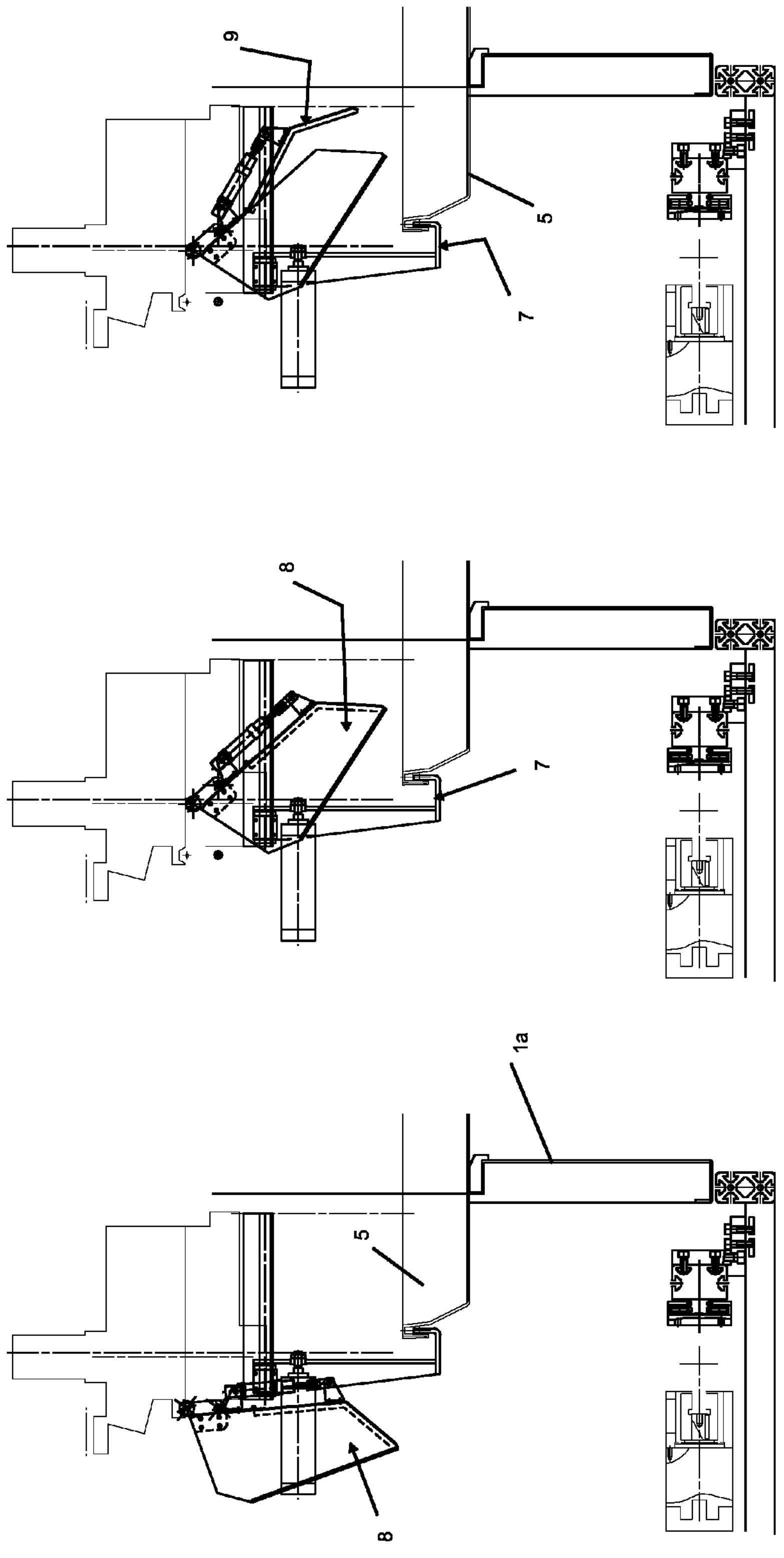
Figure 4:
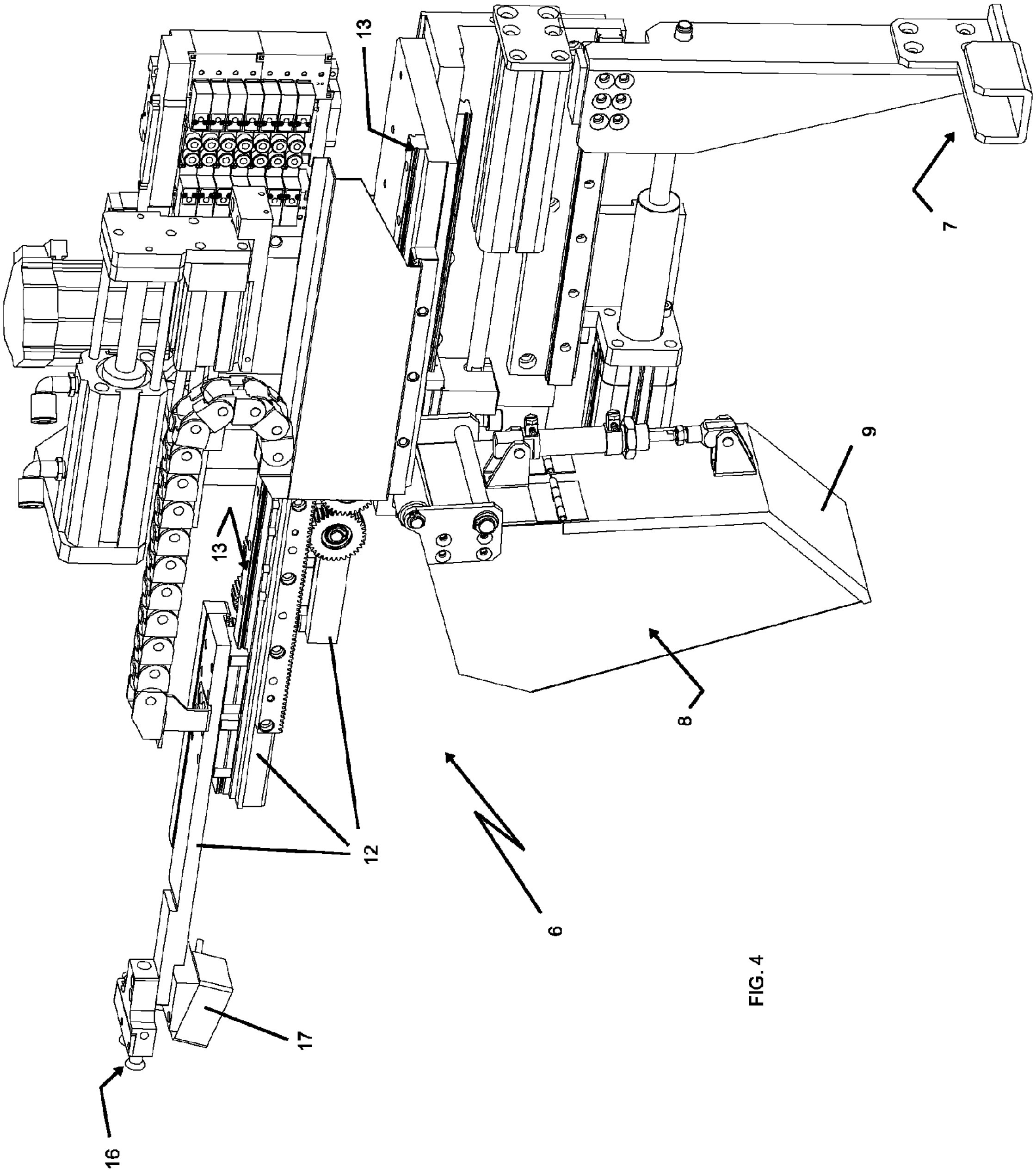
Figure 5:
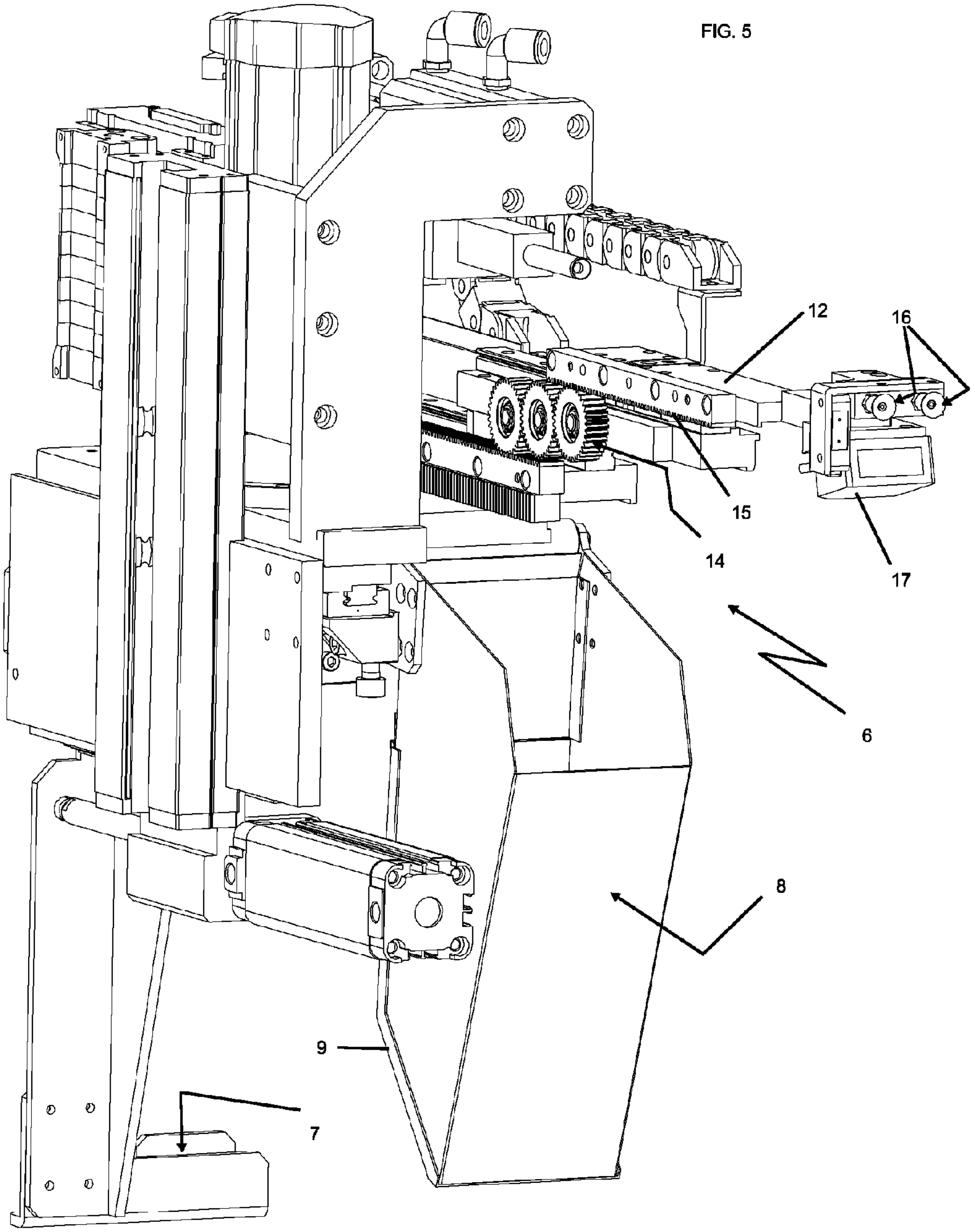
Figure 6:
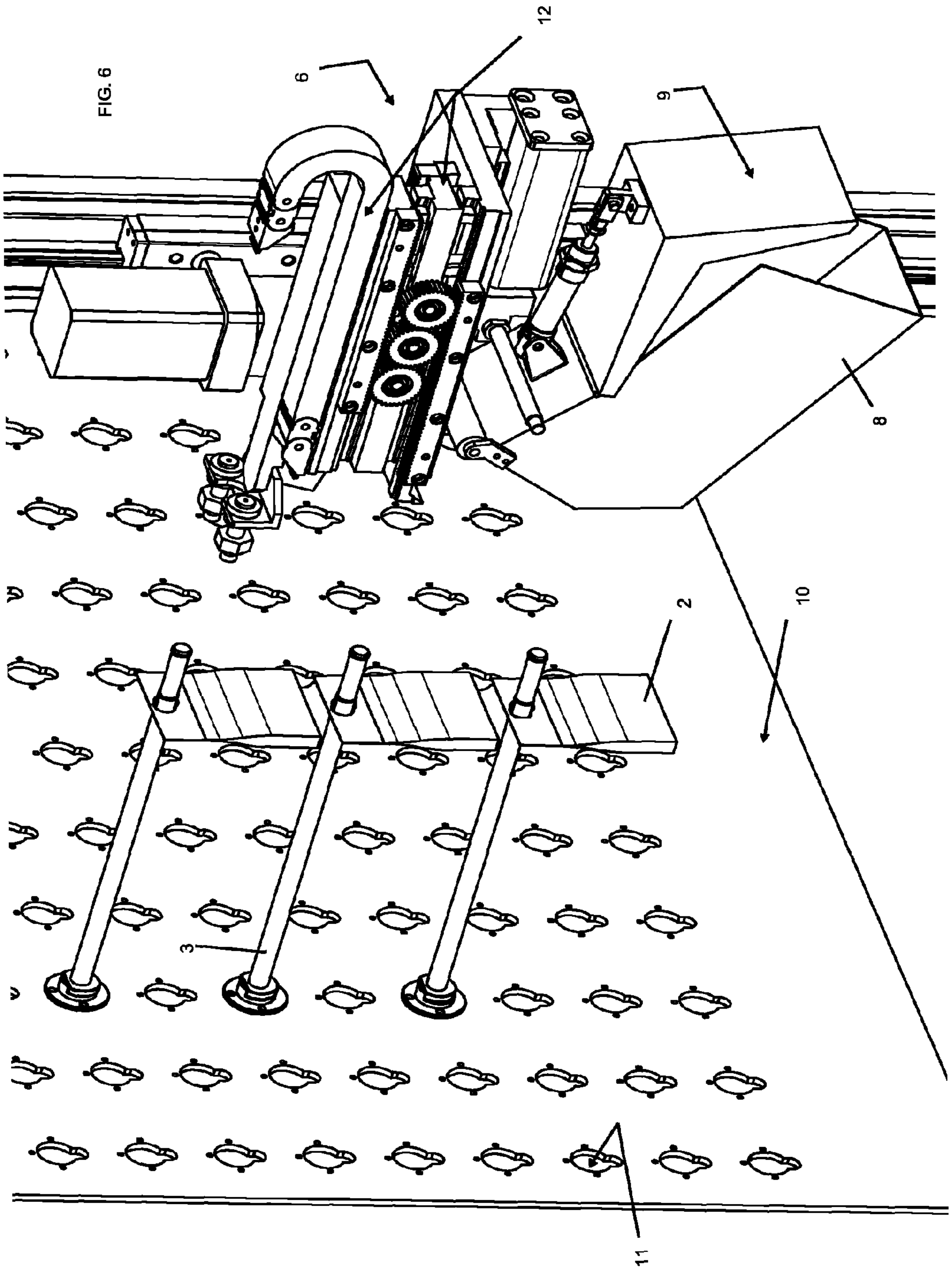
Figure 7:
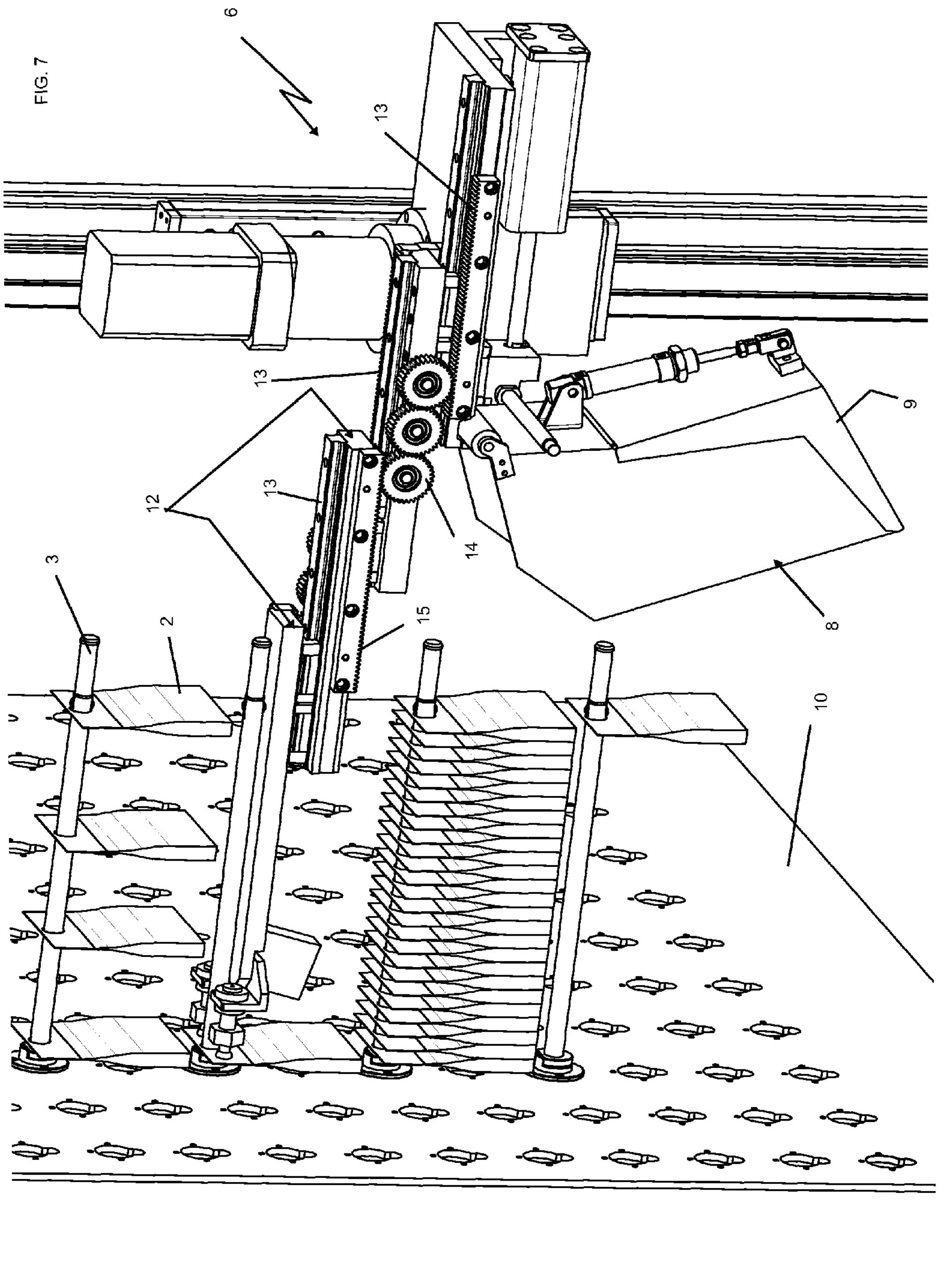
Figure 8:
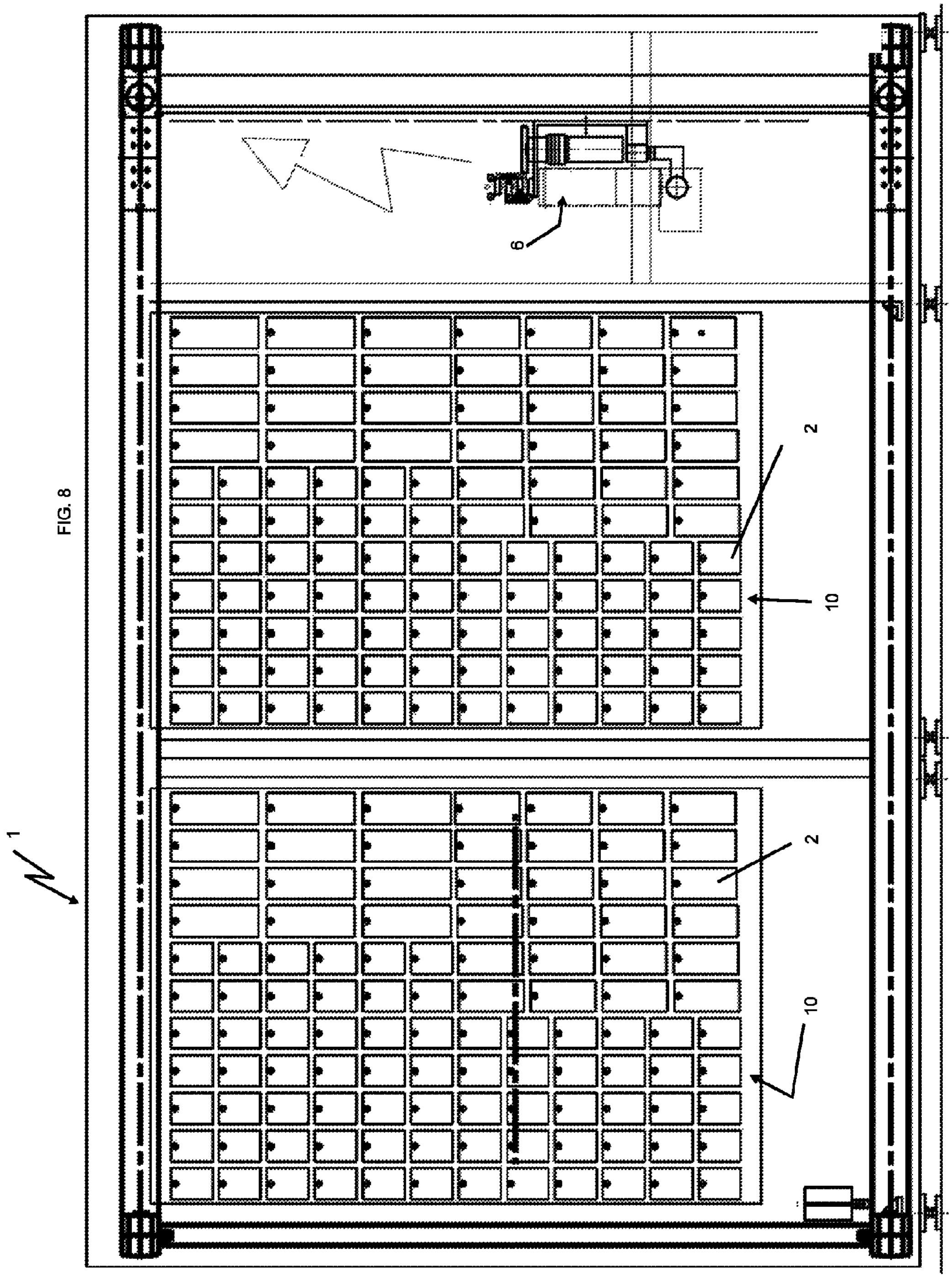
Figure 9:
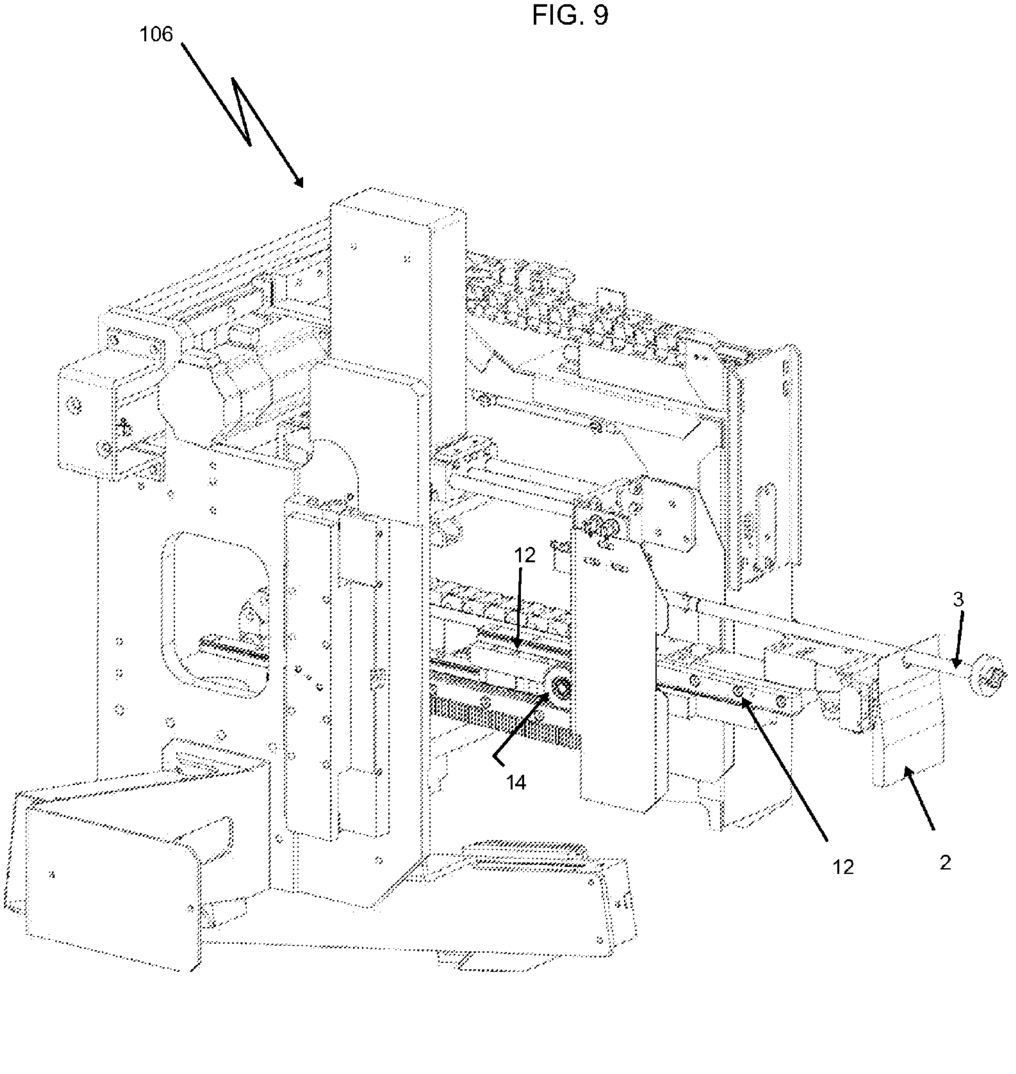
Figure 10:
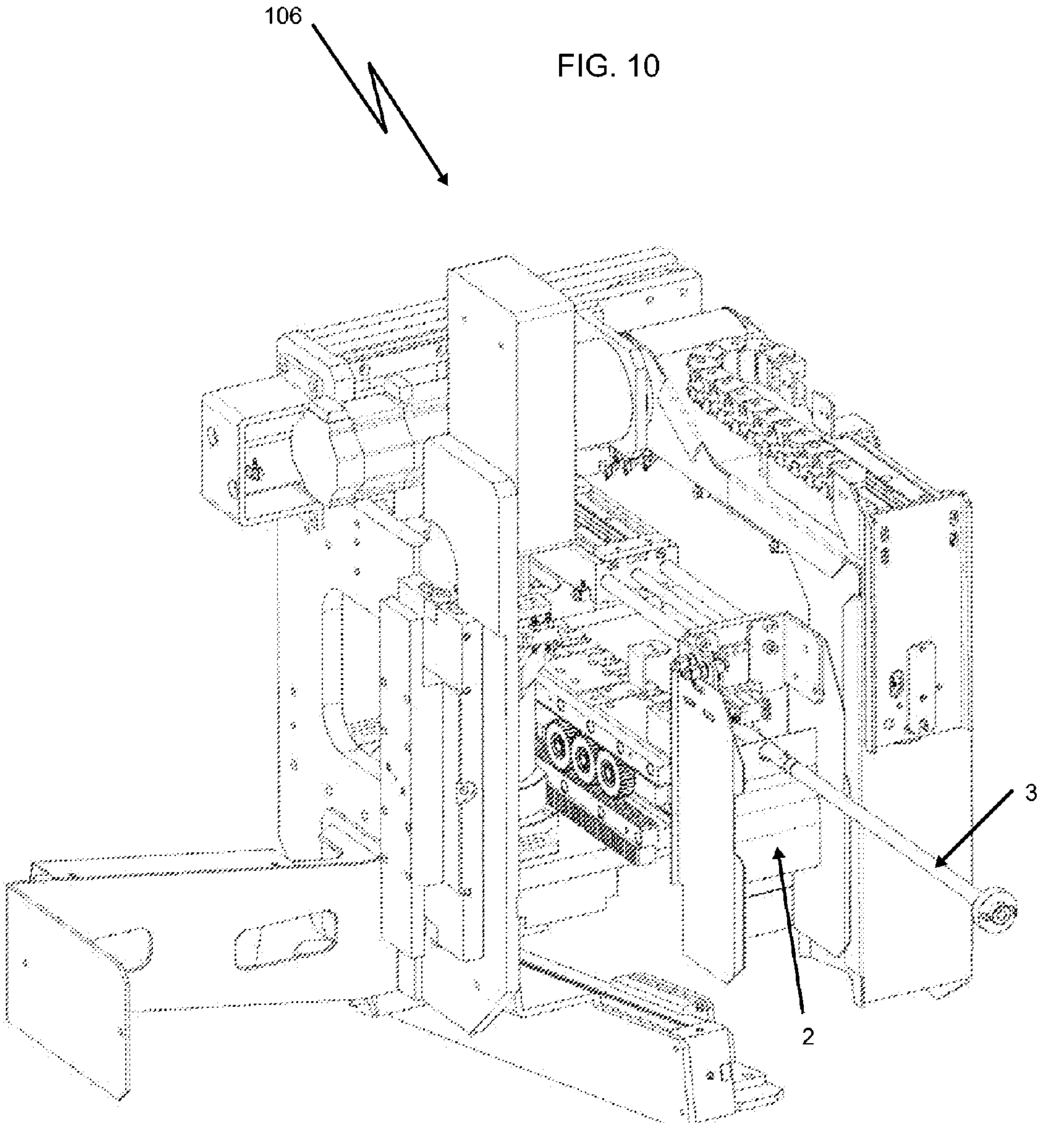
Figure 11:
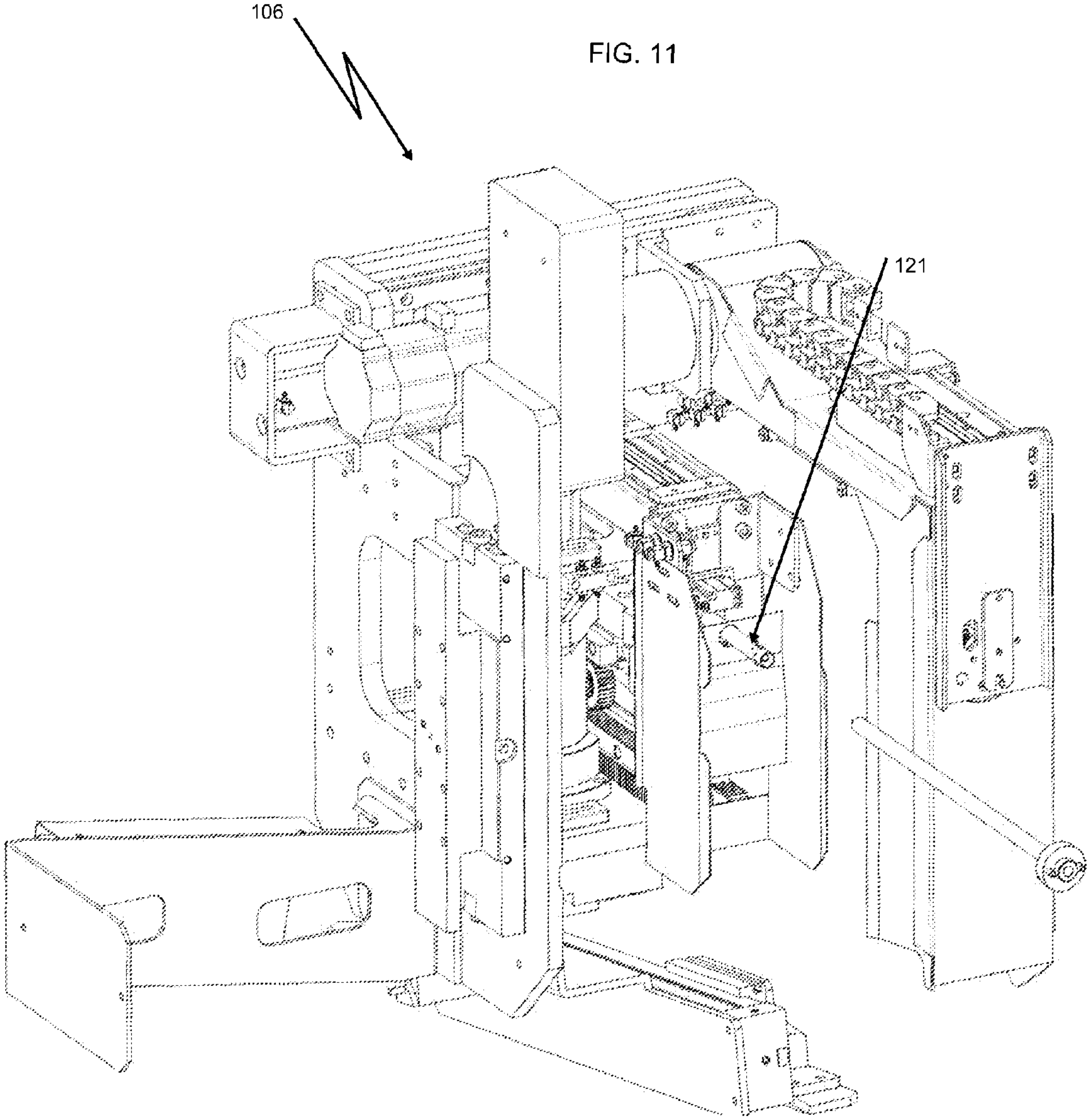
Figure 12:
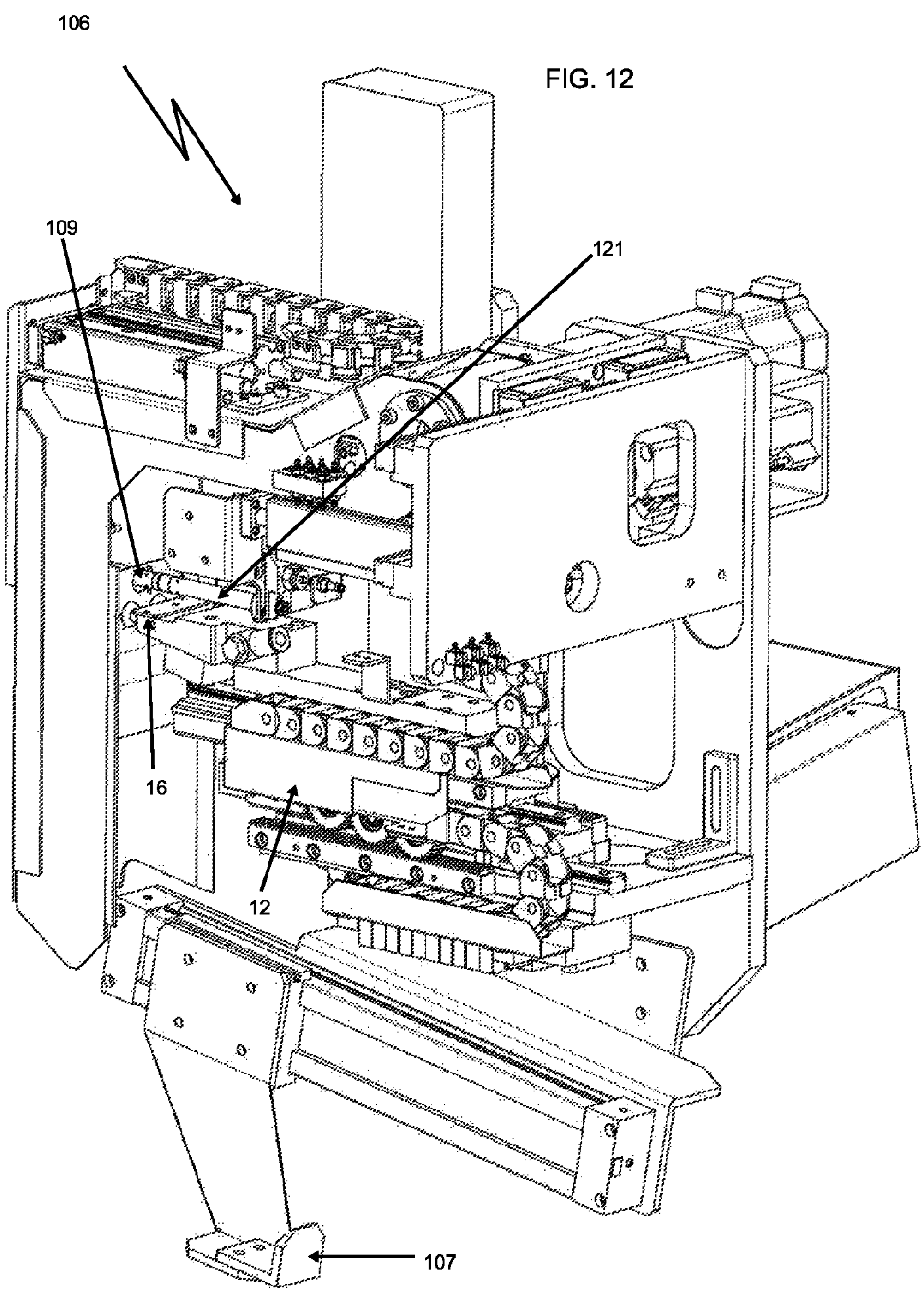
Figure 13:
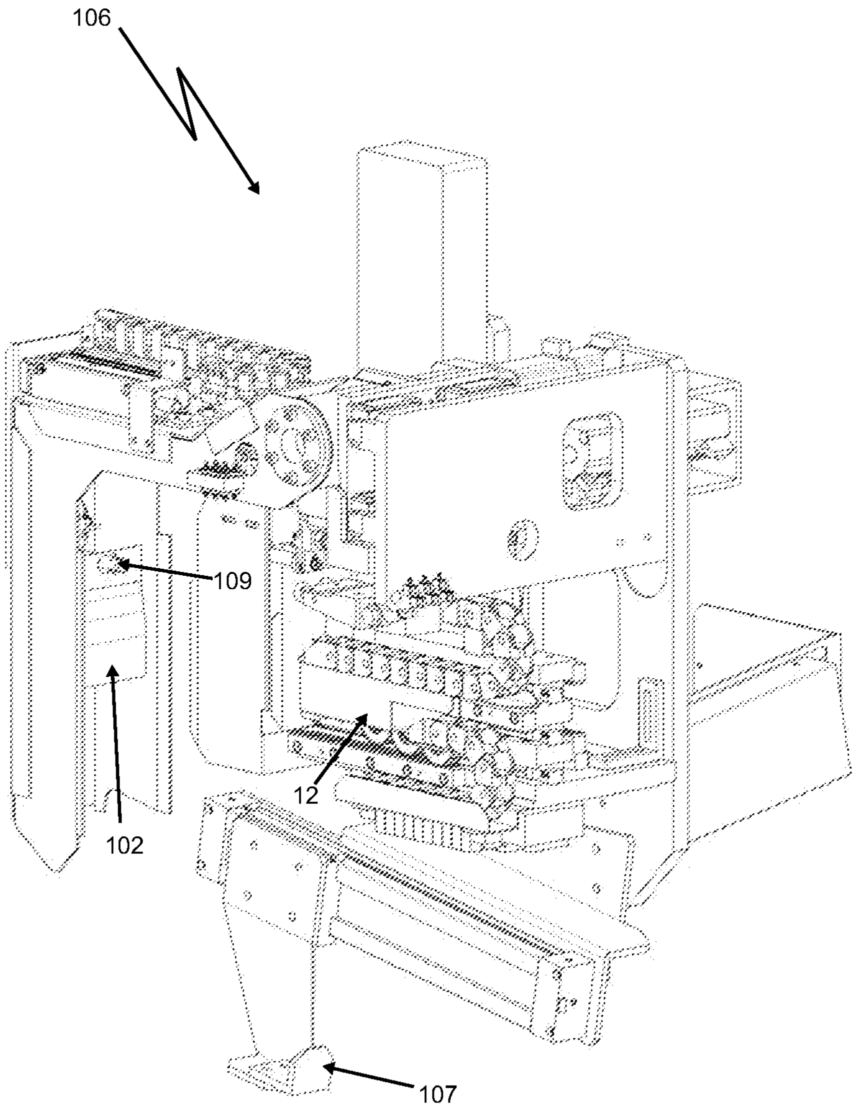
Figure 14:
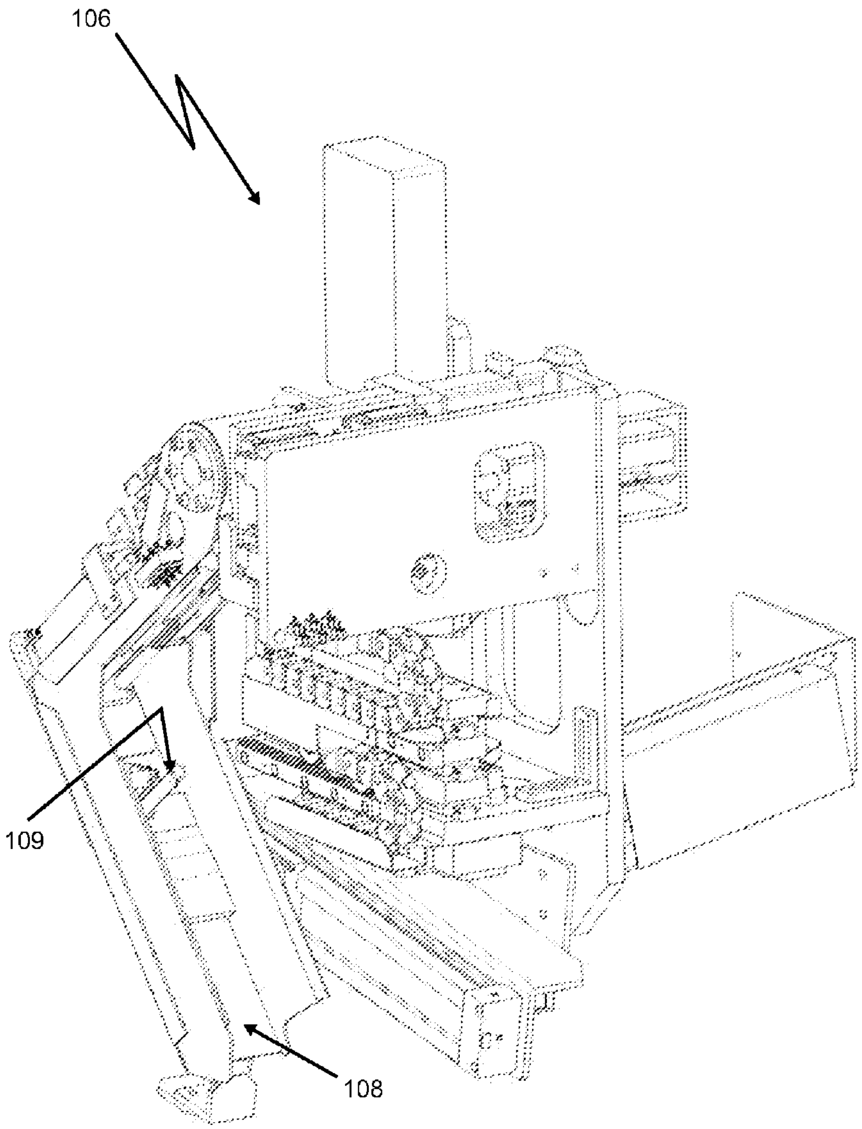
Figure 15:
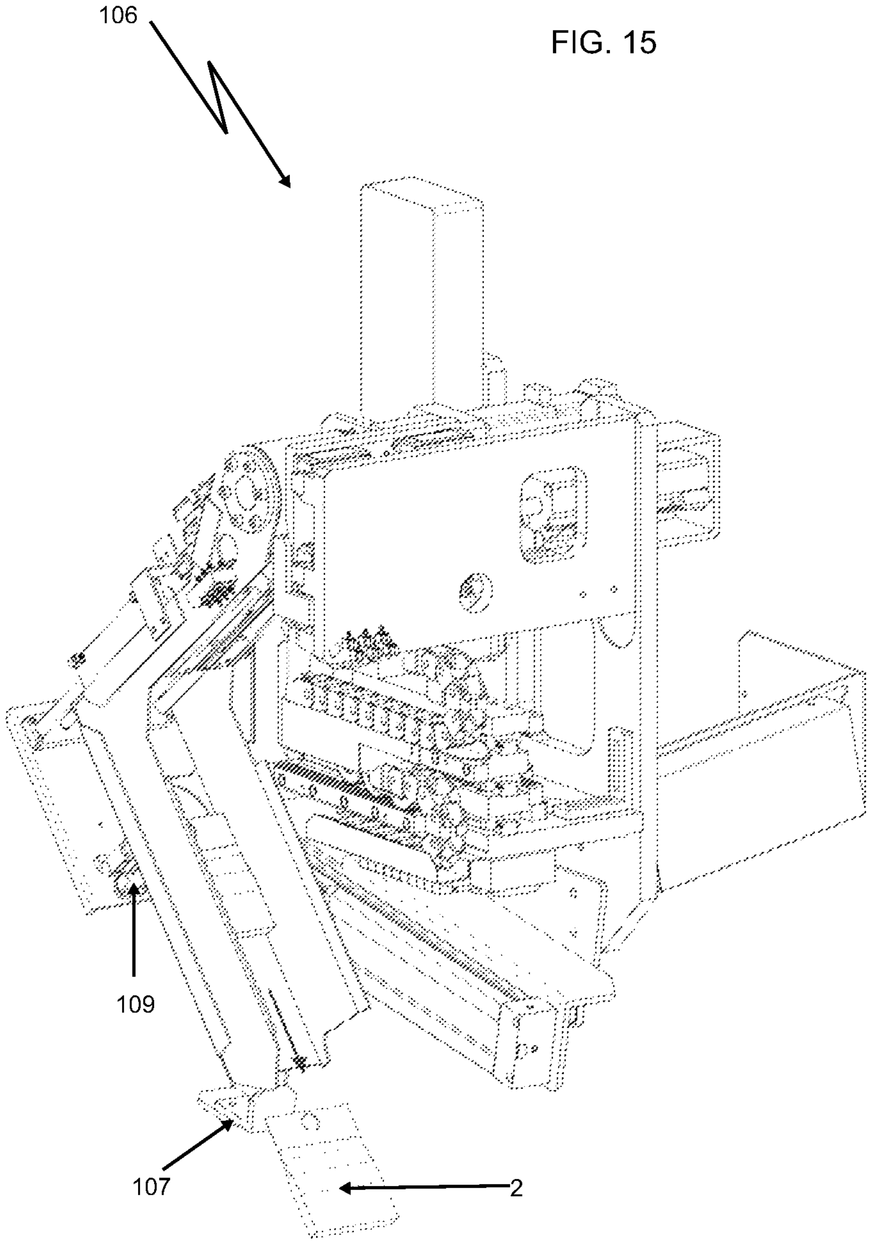
Figure 16:
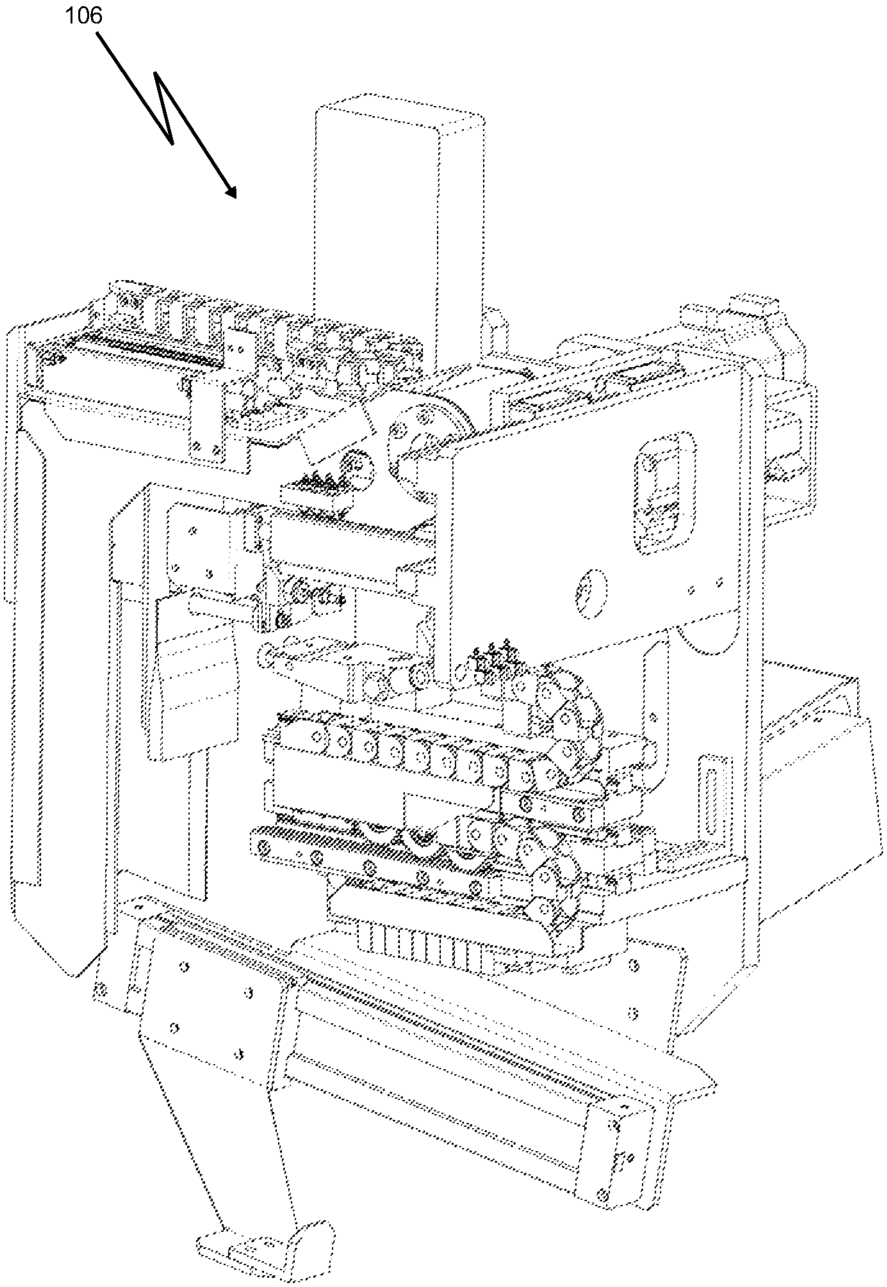

FIG. 3 shows three subsequent steps, C, D and E of the inventive assembly, particularly the delivery of unit doses into a drawer/compartment of the associated cart, FIG. 4 is a perspective view of the manipulator unit of the inventive apparatus, FIG. 5 is a further perspective view of the manipulator unit of FIG. 4, FIG. 6 is a perspective view of the opening of an intermediate recipient (a holder or container means attached to the selector means) associated with the manipulator unit, in which the unit doses that fill the patient-specific medicament prescription are held before being delivered into respective compartments of the cart connected to the apparatus, FIG. 7 shows the time at which a unit dose is picked up by the telescopic unit of the manipulator as shown in FIGS. 4, 5 and 6, FIG. 8 is an inside front view of the automated pharmaceutical dispensing apparatus of the invention, FIG. 9 shows a second variant embodiment of the manipulator unit as it picks up the unit dose from the dose matrix, FIG. 10 shows the manipulator unit of FIG. 9, with the dose grasped and placed on a spout associated to the unit, FIG. 11 also shows the manipulator unit of FIG. 9, with the dose grasped thereby, FIG. 12 shows the unit of FIG. 11, as shown from another point of view, FIG. 13 shows the dose on the holder means of the manipulator unit of FIG. 9, FIG. 14 shows the unit of FIG. 13 in a position adapted for delivery into the drawer of the cart, FIG. 15 shows the unit dose released by the intermediate holder means, FIG. 16 shows an overall view of the device of FIG. 9 as taken in a different perspective view.

Figure 17:
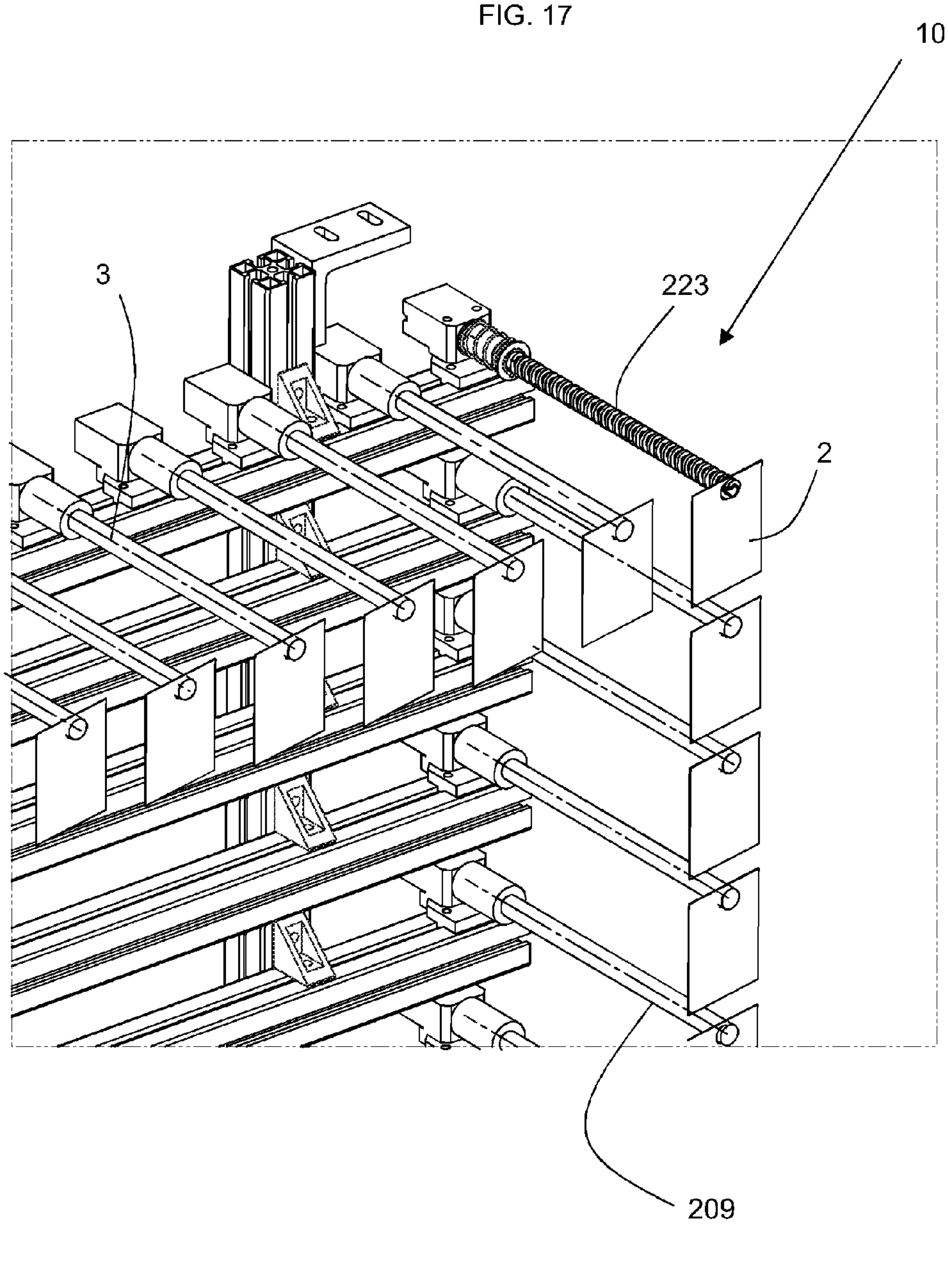
Figure 18:
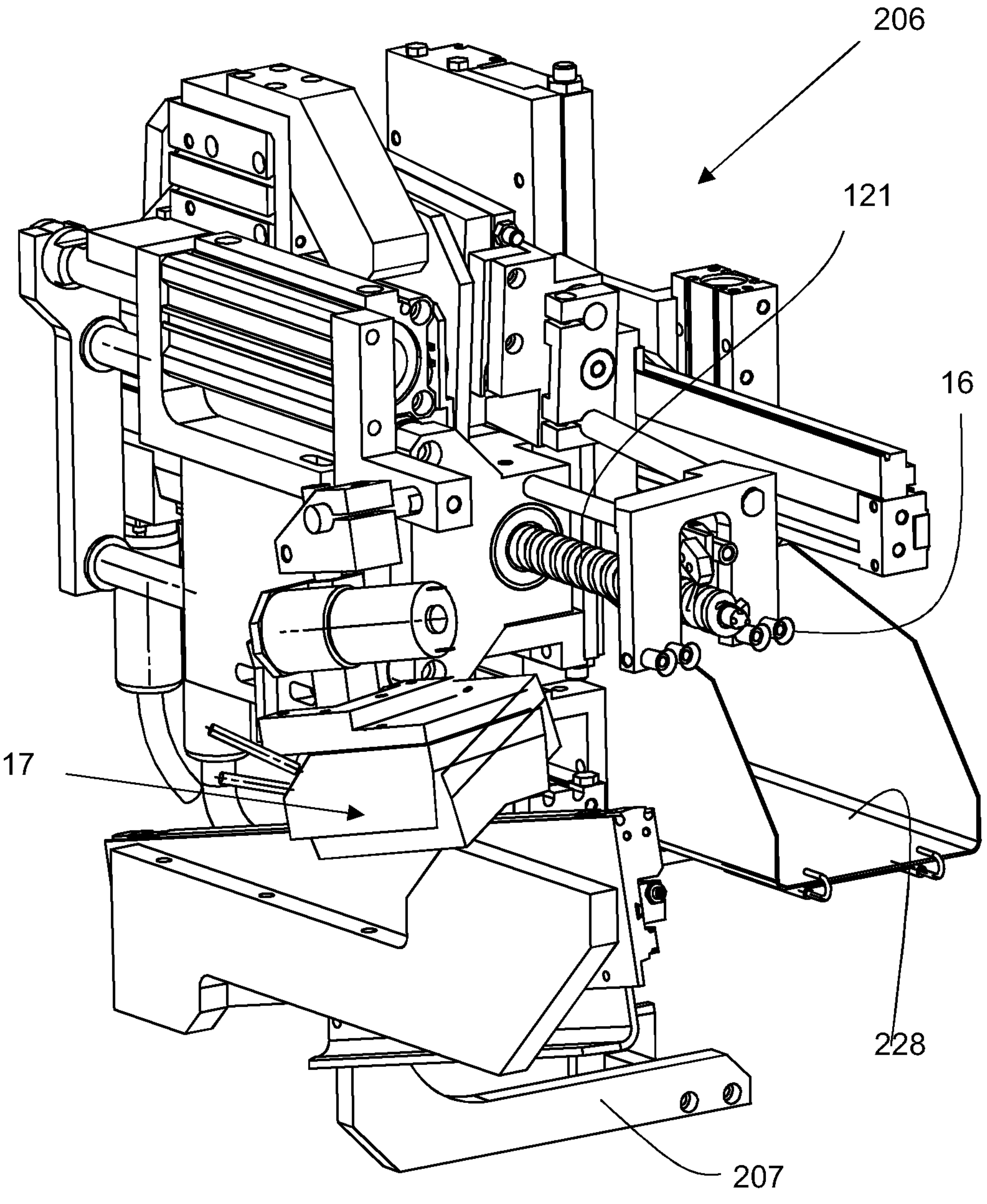
Figure 19:
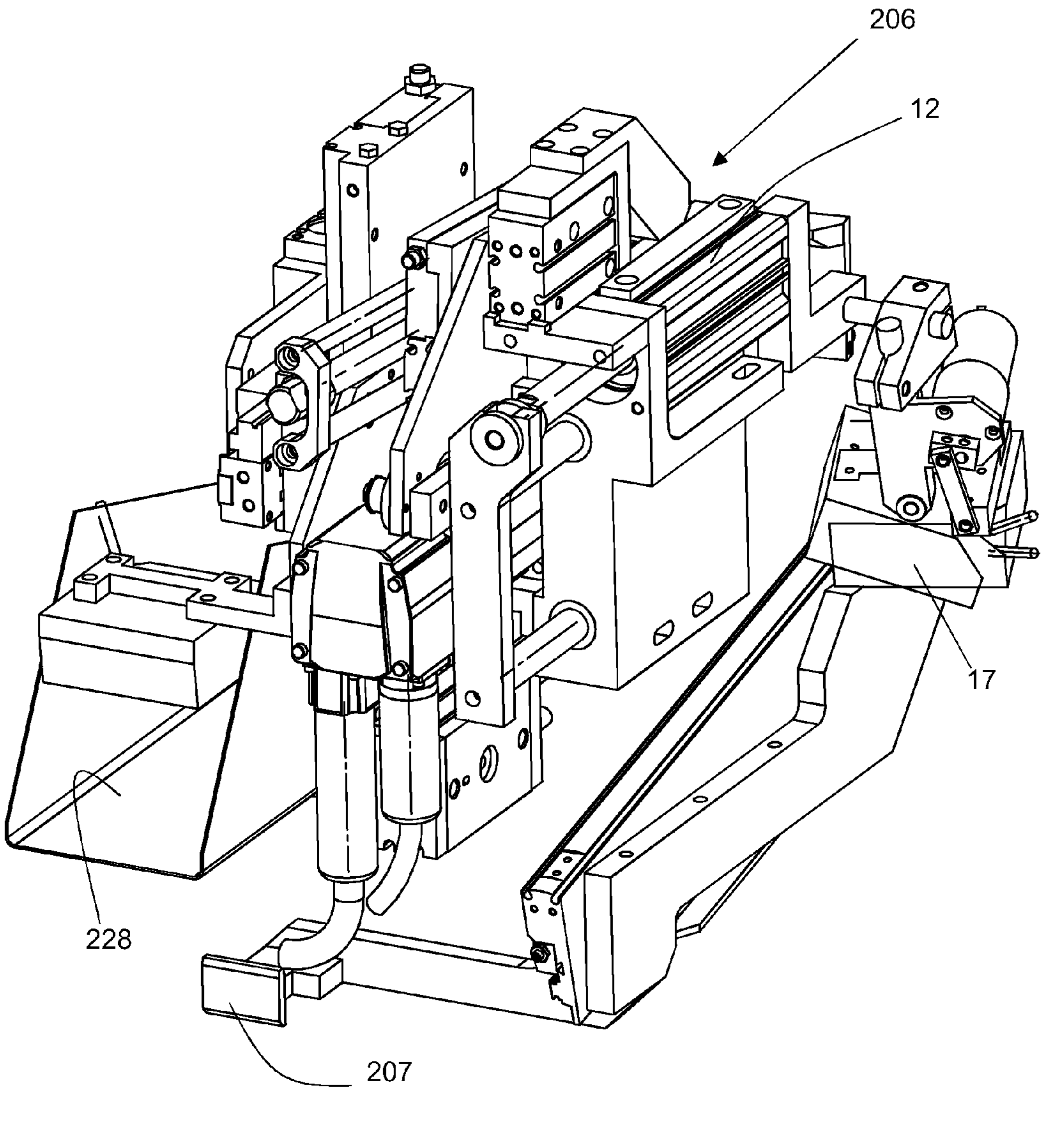
Figure 20:
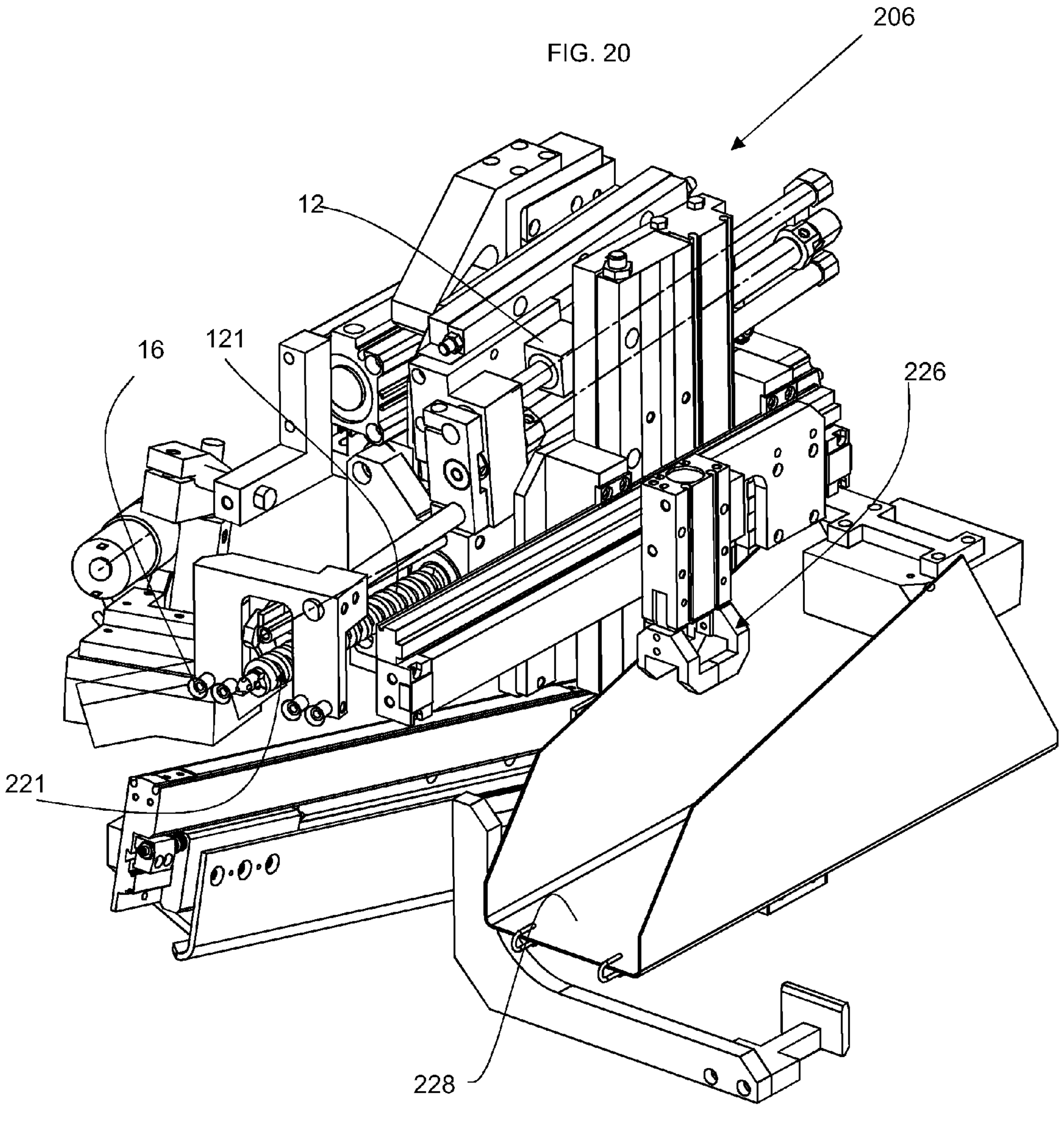

FIG. 17 shows a different type of rods or pegs adapted for use with the dose matrix in the cabinet FIGS. 18, 19, 20 show a third variant embodiment of the manipulator unit.

DETAILED DESCRIPTION OF THE INVENTION

Figure 1:
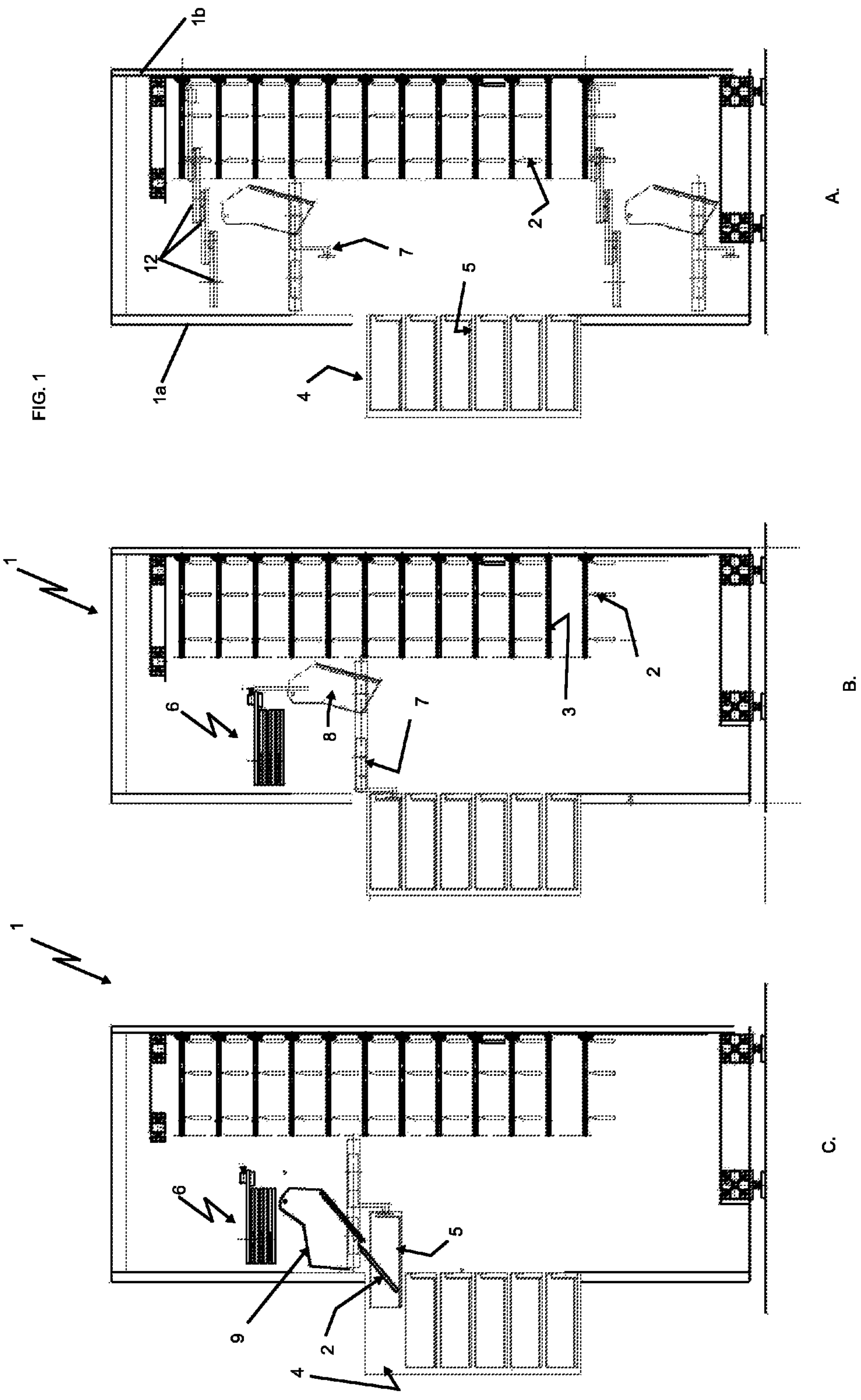
FIG. 1 shows three operating steps of the inventive stock.

Referring to FIGS. 1 and 8, numeral 1 generally designates an automated apparatus for dispensing pharmaceutical products in unit doses 2 or administration units, said doses 2 being supported by substantially horizontal pegs or rods 3 which are in turn divided over a panel or matrix 10, as shown in greater detail in FIGS. 6, 7 and 9, having special hanging loops 11.

The panel 10, the rods 3 and the doses 2 are held within the closed structure, designated by 1*a* at the front and 1*b* at the rear, of the device 1, and are thereby protected from manual handling.

Special means are provided at the front 1*a* of the structure, for connection with a cart 4 (the drawers whereof being only shown) having compartments/drawers 5 for containing patient-specific medications, e.g. to be administered daily or at specific administration times: in the coupled state, the drawers/compartments 5 face towards the inside of the apparatus 1.

Although this is not shown, the cart 4 and the apparatus 1 are joined together by special centering and/or coupling means, such means being commonly known and used for the intended purposes.

A partition (not shown) on the front wall 1*a* is lifted after connection and coupling between the cart with and the apparatus 1, thereby leaving a gap of a size substantially corresponding to that of the drawers 5 of the cart 4.

FIG. 3 shows the effects achieved by joining together the dispenser 1 and the cart means 4 for carrying the medicaments to the ward rooms: namely, the inventive system allows dispensing of unit doses 2 previously selected and picked up from the matrix 10 of doses arranged and stored in the apparatus 1 into the drawers or compartments 5 of the cart 4.

The compartments will be loaded using a manipulator unit 6, 106, 206 which is free to move, for instance in a Cartesian coordinate system, within the apparatus 1 for storage of unit doses 2.

A first embodiment of the manipulator unit (designated by numeral 6), will be described below with reference to FIGS. 4, 5, 6 and 7 and a second embodiment of the manipulator unit (designated by numeral 106) will be described in detail (as shown away from the apparatus 1) with reference to FIGS. 9, 10, 11, 12, 13, 14, 15, 16, and finally a third embodiment of the manipulator unit (designated by numeral 206) will be described, as shown away from the rest of the apparatus, with reference to FIGS. 17, 18, 19, 20.

These manipulators 6, 106, 206 have the following purposes within the assembly defined by the apparatus 1:

selecting and picking up the unit doses (2) required to fill patient-specific prescriptions from said dose matrix (10), loading a compartment (5) of a cart means (4) with said unit doses (2) so selected and picked up.

The unit doses 2 are supported by substantially horizontal pegs or rods 3, carried by a panel or matrix 10 having special hanging loops 11; said panel 10, rods 3 and respective doses 2, contained in the closed structure 1*a*, 1*b* of the apparatus 1, are protected by undesired handling.

Each manipulator unit, as described below, is used to fill the dispenser/apparatus 1.

Namely, the manipulator units 6, 106, 206 have at least one telescopic gripper arm 12 and gripper means for selecting and picking up the unit doses 2 from the matrix 10.

This manipulator unit 6, 106, 206 also has means 7, 107, 207 for opening and closing said drawers/compartments 5 by coupled interaction therewith, to directly load them with the selected products.

The above is shown in the steps A, B, C of FIG. 1, which illustrates the process carried out by the manipulator unit 6; nonetheless, they will be obviously applicable to the manipulators 106 and 206, which also fall within the scope of the present invention.

FIG. 1 shows the process of selecting the doses 2 and delivering them into one of the dedicated drawers 5 once this drawer 5 has been opened by the manipulator unit 6.

The products that have been picked up in unit doses 2 may be loaded into the compartment 5 either after selection of all patient-specific medicament doses or as they are selected from time to time; in the former case, the doses will be temporarily held by a retainer means 9, 109 of the manipulator unit 6, 106.

According to the third variant embodiment, with the manipulator 206, while the products that have been picked up in unit doses 2 are still loaded into the compartment 5 after selection of all patient-specific medicament doses, now each dose 2 picked up from the matrix 10 is temporarily delivered back into a dedicated zone of the cabinet and held therein by a retainer means 209.

Figure 2:
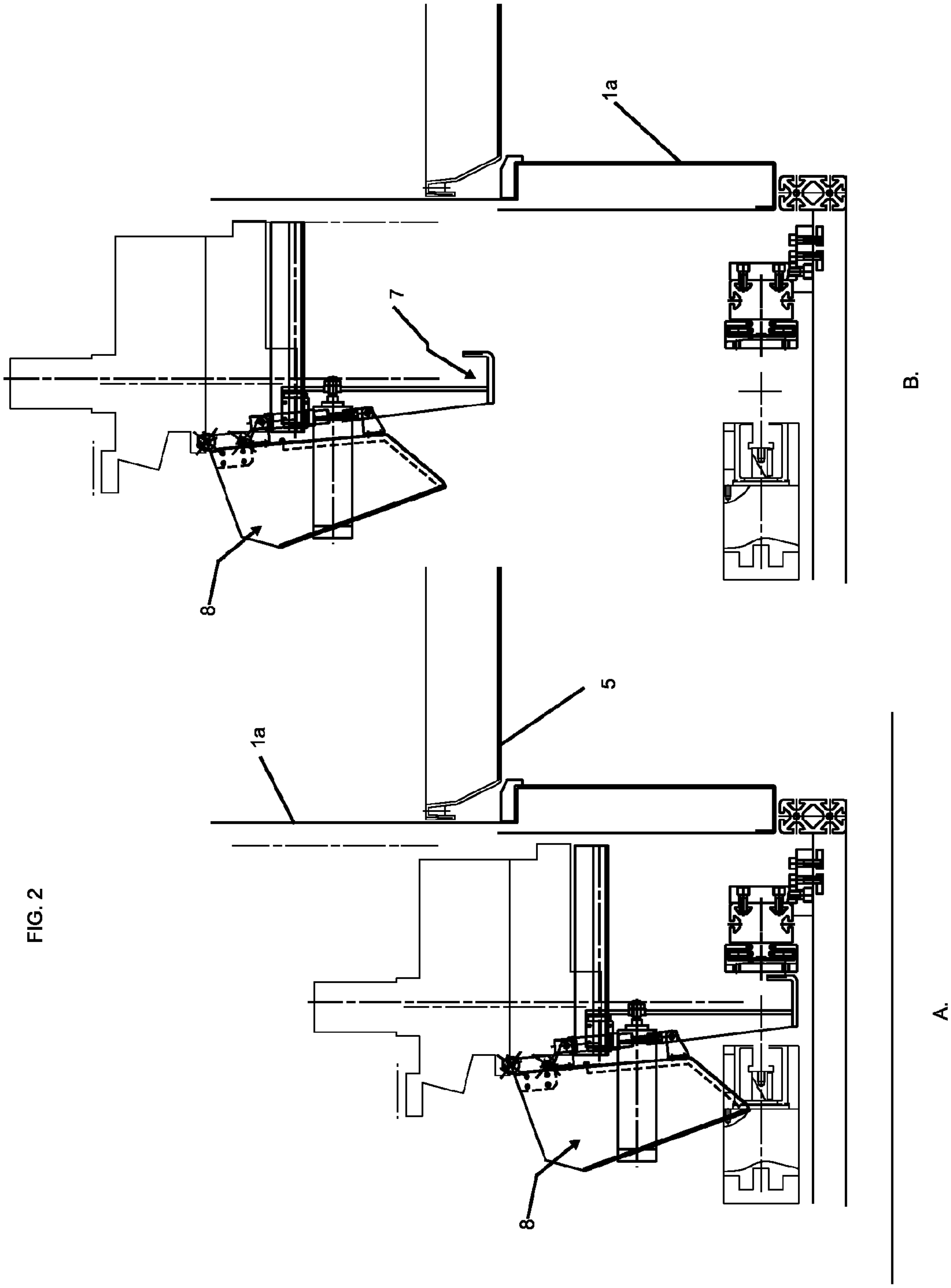
FIG. 2 shows two handling steps, A and B, of the manipulator unit.

FIGS. 2 and 3 show five steps A, B, C, D and E, in which the manipulator unit 6, 106, 206 is disposed in a Cartesian coordinate system to be caused to grip a compartment 5 of the cart by a coupling hook 7, 107, 207 to open it into the apparatus 1 and load the picked up doses therein.

The manipulator unit moves in the vertical direction in FIG. 2 and in the horizontal direction in FIG. 3.

The manipulator unit 6 includes an intermediate holder 8 for the doses 2 and a retainer means such as an automatically openable door 9, allowing the doses 2 to fall once the corresponding compartment 5 has been opened (step E of FIG. 3 and step C of FIG. 1).

If the manipulator unit 106 is used, as shown in FIG. 9 and on, the doses 2 will be temporarily automatically placed on a retainer means 109 and then, as the latter slides off, the doses 2 will be dropped after opening the corresponding compartment 5. For a more detailed description of the unit 106, please refer to the following paragraphs.

If the manipulator unit 206 is used, as shown in FIGS. 18, 19, 20, all the doses 2 temporarily held by the retainer 209 (in the cabinet) will be grasped by the gripper 226 integral with the manipulator 206 and discharged through the tilting chute 228 into the dedicated compartment in the cart.

As mentioned above, the manipulator 6, 106, 206 can move along the three Cartesian axes across the width of the panel or matrix 10 with the doses 2 to conveniently reach and open the compartment 5.

The manipulators 6, 106, 206 grasp doses 2 using a telescopic arm 12 that allows even the innermost doses 2 to be reached.

The telescopic arm 12 slides along linear guides 13, as shown, for example, in FIGS. 6 and 7; while reference is made in the present examples and disclosure to an embodiment in which the arm 12 is driven by mechanisms with gears 14 and racks 15, this embodiment may be susceptible to equivalent drive variants without departure from the scope of the present invention.

The manipulators 6, 106, 206 grasp the unit dose 2 using suction cup means 16 and identify it by means 17 for reading the dose barcode: this barcode will be used both during the pick-up step and during replenishing of the matrix 10 of the apparatus 1 by the manipulator unit 6.

Concerning replenishing with administration units 2, this is only a partially manual process which involves loading of a dedicated separate area of the apparatus 1, somewhat a loading receptacle consisting of a panel equipped with bars (similar to the matrix 10 as shown in the figures), which slides out to be loaded by the operator with the required unit doses that will be later automatically rearranged by the manipulator 6, 106 during the pauses of the process in which they are loaded into the cart 4; the operator is not required particular positioning of unit doses (2); he can place the doses randomly (so saving time) because the apparatus 1 is able to read—via the bar code—each dose and to place it in the desired position as managed by the software.

The manipulator unit 6, 106 is equipped with all the elements required for driving it in the axial direction, for driving its telescopic arm 12, for operating its suction cups 16 and for driving the compartment-coupling hook 7, 107, the retainer means 9, 109 and the chute 8, 108.

In other words, the chute 8 and the corresponding retainer means 9 form an intermediate holder for the unit doses 2 that have been picked up.

The coupling means 7, 107 is connected to the manipulator unit 6, 106 and may be displaced in such a manner as to cause the compartment 5 to be grasped and opened or closed.

As shown in step E of FIG. 3 and in step C of FIG. 1, the chute 8, 108 may be rotated for easier alignment with the underlying drawer/compartment 5 opened by the coupling hook 7, 107.

Once the matrix 10 of the apparatus 1 has been loaded with the available doses, the cart 4 is separated and possibly completed with the medicaments that cannot be introduced in the dispenser 1.

The motion of the manipulator 6, 106, 206, the management of medicaments in the compartments 5, as well as the steps of picking up the doses 2 and filling the matrices 10 therewith is conveniently automatically managed by dedicated software that can indicate how many units are present in the apparatus 1, how many units are required for filling the medicament prescription, how many units are missing to fill the medicament prescription, and which products are not present in the apparatus 1 and have to be manually loaded in the cart 4.

Namely, the software has a plurality of features, including:

- medicament regime design directly based on prescription lists. At the end of the procedure the software informs the prescription and administration system about its operation and can give the result of its operation upon user's request even when the user unlocks the cart via a PC panel.
- delivery of medicaments as needed: the software accedes to a medicament delivery request even for medicaments that are not included in a prescription, by an occasional discharge procedure.
- mission and inventory priority management, ensuring that each mission is accomplished with higher priority being assigned to occasional medicament delivery and medicament regime design. Other features, such as loading of single doses on stock and handling doses for optimization of expiries and storage spaces are managed with lower priority.
- optimization of medicament shelf life in the cabinet, allowing approximate FIFO management: based on one of the lowest priority missions, the software periodically checks the expiry of individual doses and the shelf life thereof in the cabinet: if a configurable tolerance parameter is not fulfilled, then the software imparts a dose reversal mission on a single bar, to move the doses to be handled first into the first positions. Any expired doses are directly removed from the cabinet stock and deposited in a compartment waiting to be sent back to the central pharmacy.
- multi-drug bar management, which means that one peg 3 may be loaded with doses of different low-rotation medicaments, because the software knows the position of each medicament dose.
- temperature control and ventilation/conditioning of the storage space, also it records termperatures for documentation and certification purposes
- stock consistency and congruence management by automatic physical inventory
- availability of an integrated administration environment for managing the configuration parameters of users and the operating environment.

The cabinet is equipped with personal computers, possibly with touch screen displays and will be ready for connection with a LAN network or the like.

As mentioned above, FIGS. 9 to 16 are detail views of the manipulator unit 106, which differs from the manipulator 6 as described above substantially for the procedures it uses to pick up, hold and release the administration unit.

Particularly, the figures show that the unit 106 has a substantially horizontally extending spout 121 which is adapted to be coaxial and aligned with the corresponding pegs 3 with which it comes in contact, thereby allowing the suction cup means 16 to grasp the dose 2 and move it from the peg 3 onto the spout 121 (here again, selection may obviously occur after recognition of the dose barcode using the reading and identification means).

Particularly referring to FIG. 17, it will be appreciated that the pegs or rods 3 not only act as substantially rod-like dose-receiving components, but may also have helical threads, designated by numeral 223 which may be rotated for axial displacement and handling of the dose introduced in the groove of the helical threads.

In this case, the spout 121 has identical helical threads and is motorized for axial feed of the dose (see numeral 221).

One example of the above is shown in FIGS. 18, 19, 20, with the spouts 221 formed as mentioned above.

Also, the manipulator 106, 206 uses a telescopic arm 12 which slides along linear guides 12, allowing to reach even the innermost doses 2, as well as a number of mechanisms with gears 14 and racks 15.

Once the dose 2 has been positioned on the spout 121 of the manipulator 106, said picked up dose is pushed in the opposite direction by the suction cups 16 onto a support or retainer means 109, somewhat a counter-spout, so that it can be temporarily held thereon and allow more unit doses to be picked up from the matrix 10.

Once the dose 2 has been positioned on the spout 221 of the manipulator 206 (by rotating the pegs with the threads 223 and the threaded spout 221), contra-rotation of the spout 221 allows repositioning thereof onto the support or retainer means 209, somewhat a counter-spout, located in the cabinet and/or particularly a dedicated area of the matrix 10 so that it can be temporarily held thereon and allow more unit doses to be picked up therefrom.

When all the doses 2 required to fill a prescription have been picked up, a certain number of unit doses 2 will be found on the retainer 109, 209: now, the coupling hook 107, 207 is used to open the compartment 5 of the cart 4 that is suitably secured to the apparatus 1 and, as the retainer 109 is retracted (see FIGS. 14 and 15) or the gripper means 226 are moved forward (see FIGS. 18, 19) the doses will be released into the underlying compartment 5.

Preferably, a tilt chute 108, 228 is used, as described above for the manipulator 6, to properly route the doses to their final destination.

The above described apparatus 1 has a modular construction, as it can be expanded with dose-holding structures and matrices 10, according to special needs; extension bars will be provided for this purpose to allow the manipulator unit 6, 106, 206 to reach all parts of to extended dose-holding structure.

Concerning the unit doses 2, while reference is made in this example to unit doses 2 that are suitably prepared and packaged into flexible packs, this embodiment shall not be intended to limit the scope of the invention, the manipulator apparatus being also used for packages of any other shape and structure, either rigid or flexible, and of any material, as long as it has holes or loops or strings or other arrangements for coupling and support on respective pegs 3, 223.

It shall be finally understood that the manipulator unit 6, 106, 206 can be used for loading not one but multiple carts 4 associated therewith, multiple compartments 5 being loaded for each cart 4.

The matrix pattern as shown in FIG. 8 shall be only intended as an example, the apparatus being characterized by modularity and expansibility, and allowing the addition of further sections containing matrices of pegs 3, in response to the requirements of wards having different pharmaceutical consumption parameters.

The invention claimed is:

1. An automated apparatus configured for storage and dispensing of pharmaceutical products, said pharmaceutical products being divided into unit doses or administration units, and suitably arranged in a matrix of unit doses, comprising:

a closed structure configured to hold the unit doses or the administration units so as to be protected from manual handling;

a detachable cart joined to an outside of the closed structure; and a manipulator unit inside the closed structure, which is designed for:

a) selecting and picking up the unit doses or administration units required to fill patient-specific prescriptions from said matrix, and b) loading compartments/drawers of the cart with said unit doses or said administration units so selected and picked up, said compartments/drawers facing toward an inside of the closed structure and being loaded when the closed structure and the cart are attached, wherein the manipulator unit comprises means for coupling configured for opening and closing the compartments/drawers of a means for introducing one or more of the unit doses or administration units picked up from the matrix, said means for coupling being connected to the manipulator unit to cause the compartments/drawers associated with the cart to be grasped and opened or closed.

2. The apparatus as claimed in claim 1, wherein the loading process is carried out once such that one or more of the doses or the administration units that fill the medicament prescription are selected or introduced in the compartments/drawers one by one as they are selected.

3. The apparatus as claimed in claim 1, wherein the manipulator unit includes means for introducing one or more the unit doses or the administration units picked up from the matrix.

4. The apparatus as claimed in claim 1, wherein the manipulator unit has intermediate support means for temporarily holding the selected and picked up doses or administration units until the corresponding drawer/compartment is opened.

5. The apparatus as claimed in claim 1, wherein said manipulator unit has a telescopic arm which extends along guides to reach even the innermost doses or administration units on rods.

6. The apparatus as claimed in claim 5, wherein said telescopic arm has a suction cup gripper for grasping the unit doses or administration units.

7. The apparatus as claimed in claim 5, said telescopic arm has means for reading a barcode of the dose or the administration unit to be picked up and/or handled.

8. The apparatus as claimed in claim 1, wherein said manipulator unit has means for allowing displacement along at least two vertical and transverse Cartesian axes, to cover a whole width of a panel or the matrix.

9. The apparatus as claimed in claim 1, wherein said unit doses or said administration units are supported by substantially horizontal pegs or rods carried by a panel or the matrix having special hanging loops; said panel, rods and respective doses or administration units, wholly contained in the closed structure of the apparatus are protected from undesired handling.

10. The apparatus as claimed in claim 6, wherein the manipulator unit has a spout which is adapted to be coaxial and aligned with corresponding pegs with which the spout comes in contact.

11. The apparatus as claimed in claim 10, wherein said spout and said pegs have helical threads, for axial forward displacement of the dose or the administration unit received in a groove of said threads, upon rotation of the spout.

12. The apparatus as claimed in claim 10, wherein said suction cup gripper is configured to move the dose from the peg to the spout and then from the spout to a support or a retainer means; once the retainer is retracted, the doses or administration units so picked up are released into the underlying compartment using a tilting chute which allows proper routing of the doses or administration units to their final destination.

13. The apparatus as claimed in claim 1, wherein the manipulator unit includes a chute that forms, in combination with a corresponding retainer an intermediate holder for the unit doses or administration units that have been picked up.

14. The apparatus as claimed in claim 1, wherein said manipulator unit has integral means for gripping which are adapted to grasp the doses or administration units temporarily held by a retainer of the matrix and then release the doses or administration units onto a tilting chute which allows proper routing of the doses or administration units to their final destination in their corresponding drawer.

15. The apparatus as claimed in claim 1, wherein the apparatus is modular and expansible, by addition of further sections containing matrices of pegs, in response to requirements of wards having different pharmaceutical consumption parameters.

16. The apparatus as claimed in claim 1, wherein the manipulator unit has a spout which is adapted to be coaxial and aligned with the corresponding pegs with which the spout comes in contact.

17. A method for dispensing pharmaceutical products in unit doses or administration units, comprising:

selecting and picking up the unit doses or administration units required to fill together patient-specific prescriptions from a dose matrix; and interacting with containers or drawers of an associated cart loaded with the picked up doses or administration units, said picked up doses or administration units being loaded into compartment after selection of the doses or administration units that fill the prescription or one by one as the doses or administration units are selected, wherein a closed structure is configured to hold the unit doses or the administration units so as to be protected from manual handling, a detachable cart is joined to an outside of the closed structure, said containers or drawers face toward an inside of the closed structure and being loaded when the closed structure and the cart are attached, the manipulator unit comprises means for coupling configured for opening and closing the containers or drawers of a means for introducing one or more of the unit doses or administration units picked up from the matrix, and means for coupling being connected to the manipulator unit to cause the containers or drawers associated with the cart to be grasped and opened or closed.

18. The method as claimed in claim 17, further including picking up unit doses or administration units using a suction cup on a telescopic arm of the manipulator unit that is allowed to move along the three cartesian axes.

19. The method as claimed in claim 17, further comprising selecting the doses or administration units using a barcode reader for reading a barcode on the dose or administration unit.

20. The method as claimed in claim 17, further including replenishing the matrix using a same selection and pick-up means.

21. The method as claimed in claim 20, the administration units or administration units are replenished manually in a dedicated area or a loading receptacle formed from a panel equipped with bars, which slides out to be loaded by an operator with the required unit doses or administration units that will be later rearranged by the manipulator unit; the operator is not required particular positioning of the unit doses or administration units; the operator can place the doses randomly so that a bar code reader is able to read—via a bar code—each dose or administration unit and to place each dose or administration unit in the desired position as managed by software.

22. The method as claimed in claim 17, wherein the method allows automated sequential preparation of medicaments for multiple patients, one drawer/compartment of the cart being assigned to each patient.

23. A computer program having computer program code for carrying out the method of claim 17 when said program is run on a computer, the computer program being embodied in a non-transitory medium.

24. The program as claimed in claim 23, wherein:

a) the program allows medicament regime design directly from prescription lists;

b) the program allows management of pegs even in multi-drug mode, to allow loading of one peg with unit doses of different low-rotation medicaments, the program being able to ascertain the position of each medicament dose;

c) the program allows medicament delivery as needed;

d) the program manages mission priority;

e) the program manages inventory;

f) the program optimizes dose shelf life;

g) the program controls internal ventilation/conditioning; also the program records temperatures for documentation and certification purposes;

h) the program controls stock consistency and congruence; and i) the program allows integrated management of all configuration parameters.

25. The computer program as claimed in claim 23, wherein the computer program is stored on computer readable media.

* * * * *

UNITED STATES PATENT AND TRADEMARK OFFICE

CERTIFICATE OF CORRECTION

PATENT NO. : 8,478,441 B2
APPLICATION NO. : 12/933187
DATED : July 2, 2013
INVENTOR(S) : Liguori et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 206 days.

Signed and Sealed this
Eighth Day of September, 2015

Michelle K. Lee
*Director of the United States Patent and Trademark Office*